United States Patent
Takahashi et al.

(10) Patent No.: US 7,167,996 B2
(45) Date of Patent: Jan. 23, 2007

(54) MICRO CONTROLLER UNIT

(75) Inventors: Hiroki Takahashi, Tokyo (JP); Kazuo Nakamura, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 462 days.

(21) Appl. No.: 10/690,574

(22) Filed: Oct. 23, 2003

(65) Prior Publication Data

US 2004/0210780 A1 Oct. 21, 2004

(30) Foreign Application Priority Data

Apr. 3, 2003 (JP) .............................. 2003-100434

(51) Int. Cl.
*G06F 1/12* (2006.01)
(52) U.S. Cl. ..................... 713/600; 713/300; 713/323
(58) Field of Classification Search ................ 713/300, 713/323, 600
See application file for complete search history.

(56) References Cited

U.S. PATENT DOCUMENTS

| | | | | |
|---|---|---|---|---|
| 5,473,768 A | * | 12/1995 | Kimura | ....................... 713/501 |
| 5,778,237 A | * | 7/1998 | Yamamoto et al. | ......... 713/322 |
| 5,903,746 A | * | 5/1999 | Swoboda et al. | ............ 713/501 |
| 6,081,143 A | * | 6/2000 | Ho et al. | ..................... 327/166 |
| 6,163,851 A | * | 12/2000 | Yamazoe et al. | ........... 713/600 |
| 6,268,749 B1 | * | 7/2001 | Fisch et al. | .................. 327/147 |
| 6,895,518 B1 | * | 5/2005 | Wingen | ....................... 713/320 |

FOREIGN PATENT DOCUMENTS

JP 11-272644 10/1999

* cited by examiner

*Primary Examiner*—Chun Cao
*Assistant Examiner*—Vincent Tran (57) ABSTRACT

It is an object to increase a speed of a CPU operation irrespective of an operation speed of a peripheral circuit and to prevent an increase in power consumption from being thereby caused. A clock generating circuit (10) generates two clocks having phases which are equal to each other, that is, a CPU clock ($CLK_{CPU}$) and a bus clock ($CLK_{BUS}$). A BIU (bus interface unit) (51) controls a code bus based on the CPU clock ($CLK_{CPU}$) and controls a peripheral bus based on the bus clock ($CLK_{BUS}$). The clock generating circuit (10) switches a frequency of each of the CPU clock ($CLK_{CPU}$) and the bus clock ($CLK_{BUS}$) depending on an operation mode of an MCU. For example, a speed of the CPU clock ($CLK_{CPU}$) is set to be higher than that of the bus clock ($CLK_{BUS}$) in order to carry out a high-speed operation of a CPU. Also in that case, the phases of both clocks are equal to each other. Consequently, the code bus and the peripheral bus in the BIU (51) can easily be controlled.

4 Claims, 11 Drawing Sheets

| OPERATION MODE CLASSIFICATION | OUTPUT OF THIRD CLOCK SELECTOR 21 | | SETTING OF DOUBLE SPEED SET REGISTER 18 | | |
|---|---|---|---|---|---|
| | CLK$_{CPU}$ | CLK$_{BUS}$ | b1 | b2 | b3 |
| X$_{IN}$ (X$_{CIN}$) | 1-DIVIDED CLOCK | 1-DIVIDED CLOCK | 0 | 0 | 1 |
| X$_{IN}$/2 (X$_{CIN}$/2) | 2-DIVIDED CLOCK | 2-DIVIDED CLOCK | 0 | 1 | 0 |
| DOUBLE SPEED | 2-DIVIDED CLOCK | N-DIVIDED CLOCK | 1 | 0 | 0 |
| N-DIVIDING | N-DIVIDED CLOCK | N-DIVIDED CLOCK | 0 | 0 | 0 |

MICRO CONTROLLER UNIT

BACKGROUND OF THE INVENTION

1. Field of the Invention

The present invention relates to a micro controller unit (MCU) and more particularly to generation and control of a clock signal defining an operation thereof.

2. Description of the Background Art

In general, a conventional micro controller unit (which will be hereinafter referred to as an "MCU") is wholly operated based on a single clock. With a requirement for an increase in a speed of the MCU, recently, a frequency of the clock has been increased. However, in the case in which a block (a high-speed block) which can correspond to a clock having a high frequency and a block (a low-speed block) which cannot correspond thereto are present in the MCU to be operated based on the single clock, for example, the frequency of the clock to be used in the MCU is to be set within a range to which the low-speed block can correspond. For this reason, the speed of the whole MCU cannot be increased. More specifically, an operation speed of the high-speed block which can originally be operated at a high speed is determined by that of the low-speed block. In order to increase the speed of the MCU, moreover, there is also a problem in that the low-speed block is to be redesigned greatly.

On the other hand, there has also been proposed an MCU in which a frequency of a clock for a central processing unit (CPU) (a CPU clock) and a frequency of a clock for a peripheral circuit (a peripheral clock) can be set optionally (for example, Japanese Patent application Laid-Open No. 11-272644 (1999) (pages 1 to 7, FIGS. 1 to 5) (which will be hereinafter referred to as "Patent Document 1").

In the conventional MCU disclosed in the Patent Document 1, the frequencies of the CPU clock and the peripheral clock can be set optionally. In some cases, however, phases of the CPU clock and the peripheral clock are not coincident with each other. It is necessary to provide, in the MCU, a circuit (for example, a latch circuit) for synchronizing both operations when the CPU accesses the peripheral circuit or the like. Thus, there is a fear of complexity of a circuit structure of the MCU and an increase in a cost.

There is also an MCU for generating a CPU clock from a peripheral clock which has been disclosed in FIG. 5 of the Patent Document 1. In such an MCU, the CPU clock having a different frequency from that of the peripheral clock is generated by leaving a space between pulses of the peripheral clock. In this case, a synchronization of operations of the CPU and the peripheral circuit is maintained. Therefore, there is not the problem described above.

In the case in which the high-speed block and the low-speed block are present in the MCU, however, the peripheral clock cannot but be set to have a frequency within a range to which the low-speed block can correspond. As a result, a frequency of the CPU clock generated from the peripheral clock is determined by that of the peripheral clock so that a performance of the CPU capable of originally carrying out a high-speed operation cannot be fully exhibited. In recent years in which the speed of the operation of the CPU can be increased, this problem has been great. As a countermeasure, it is preferable that a peripheral circuit capable of carrying out a high-speed operation should be used in an MCU mounting a high-speed CPU. In that case, a cost of the MCU is increased.

Moreover, there is a problem in that power consumption of the whole MCU is generally increased when the clock frequency of the MCU is increased. In a device for carrying out battery driving, for example, a portable terminal device or a notebook computer, particularly, a reduction in the power consumption is an important problem.

SUMMARY OF THE INVENTION

It is a first object of the present invention to increase a speed of a CPU operation irrespective of an operation speed of a peripheral circuit.

It is a second object of the present invention to prevent power consumption from being increased with a rise in the speed of the CPU operation.

According to the present invention, a micro controller unit has a clock generating circuit, a CPU (central processing unit), a peripheral device, first and second buses, and a BIU (bus interface unit). The clock generating circuit generates first and second clocks having phases which are equal to each other. The CPU is operated based on the first clock. The peripheral device is controlled by the CPU and is operated based on the second clock. The first and second buses are operated based on the first clock and the second clock, respectively. The BIU controls operation timings of the first and second buses. Furthermore, the clock generating circuit includes a register for holding setting of frequencies of the first and second clocks to be equal to each other or different from each other, and switches the frequencies of the first and second clocks depending on the setting held in the register with the phases of the first and second clocks maintained to be equal to each other. Moreover, the first and second clocks are input to the BIU. The BIU alternately switches idle periods of the first and second buses in predetermined timings which are synchronous with the first and second clocks, thereby carrying out the operation timing control.

The clock generating circuit can generate the first and second clocks having equal phases and different frequencies. Accordingly, in the case in which the peripheral device is a low-speed block and the CPU is a high-speed block, for example, the first clock is set to have a higher speed than the second clock. Consequently, it is possible to increase the speed of the CPU while maintaining a normal operation of the peripheral device. In other words, an operation speed of the CPU can be prevented from being determined by that of the peripheral circuit. Therefore, an operation speed of the whole MCU can be enhanced. Moreover, it is possible to increase the operation speed of the CPU without causing all elements constituting the MCU to correspond to a clock having a high frequency. Thus, it is also possible to obtain an advantage that an increase in a cost of the whole MCU can be prevented. Also in the case in which the frequencies of the first and second clocks are different from each other, furthermore, both phases are maintained to be equal to each other. In the BIU, therefore, the operation timing control can easily be carried out. For example, it is not necessary to add a circuit for synchronizing operations of a code bus and a peripheral bus.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
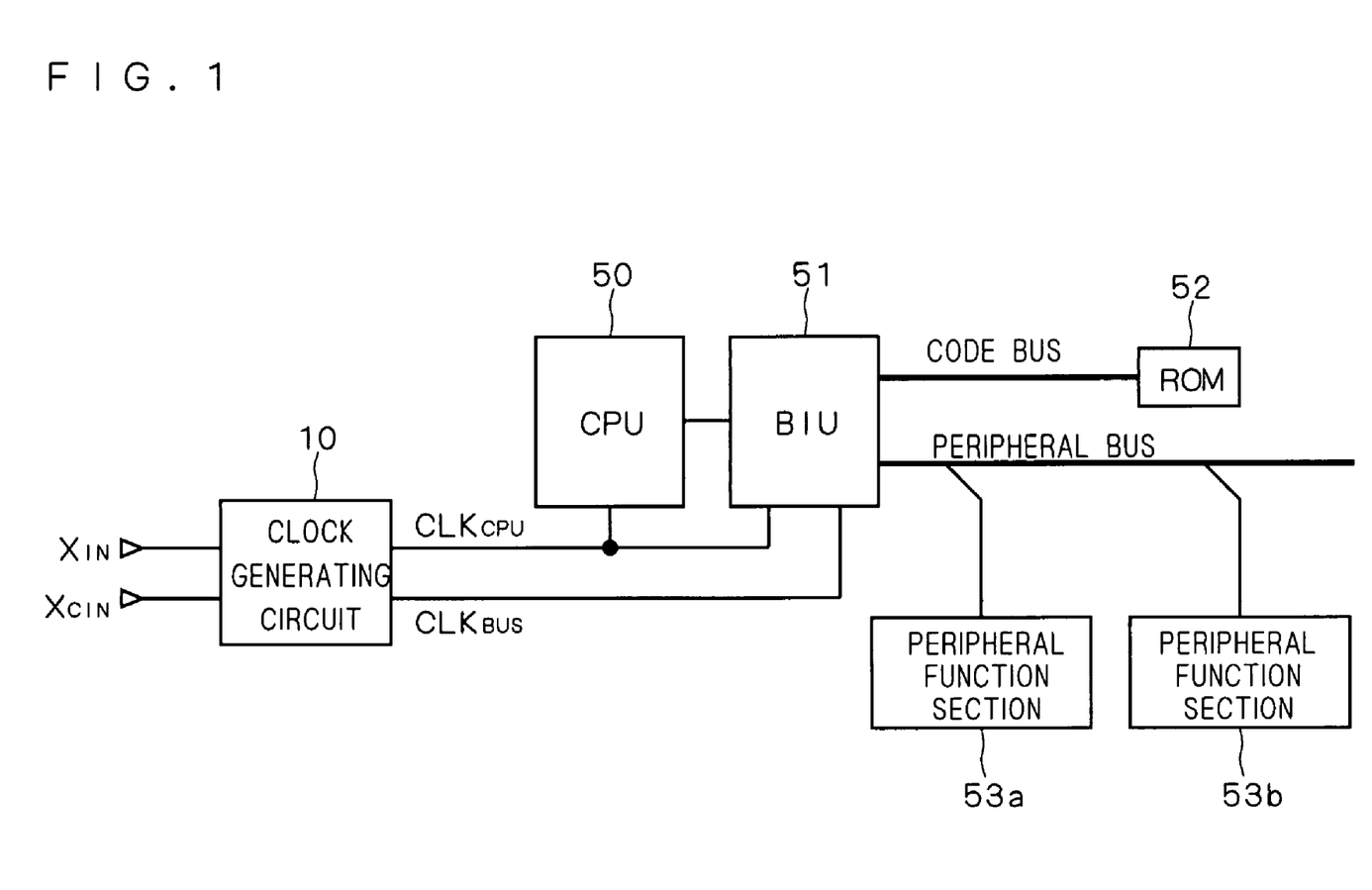
FIG. 1 is a block diagram showing a structure of a main part of a micro controller unit (MCU) according to a first embodiment.

FIG. 1 is a block diagram showing a structure of a main part of a micro controller unit (MCU) according to a first embodiment of the present invention. A clock generating circuit 10 generates a clock for defining an operation timing and an operation speed of each block in the MCU. A main clock $X_{IN}$ and a subclock $X_{CIN}$ which are references for generating a clock are input from an outside of the clock generating circuit 10 to the clock generating circuit 10. The main clock $X_{IN}$ has a high speed (high frequency) to be used in a normal operation and the subclock $X_{CIN}$ has a comparatively low speed (low frequency) corresponding to a low power consumption function which is used in battery driving or the like, for example. The clock generating circuit 10 generates two clocks, that is, a CPU clock $CLK_{CPU}$ to be a first clock and a bus clock $CLK_{BUS}$ to be a second clock which have equal (synchronized) phases to each other based on the main clock $X_{IN}$ or the subclock $X_{CIN}$.

In this specification, a clock to be a reference for causing the clock generating circuit 10 to generate a clock will be referred to as a "reference clock". More specifically, in the present embodiment, the main clock $X_{IN}$ or the subclock $X_{CIN}$ which is an external clock input from the outside to the clock generating circuit 10 acts as the reference clock.

The CPU clock $CLK_{CPU}$ is input to a CPU 50 for controlling an operation of the whole MCU and the CPU 50 is operated based on the CPU clock $CLK_{CPU}$. On the other hand, a BIU (bus interface unit) 51 is controlled by the CPU 50 and executes data transfer for a code bus and a peripheral bus. The CPU clock $CLK_{CPU}$ and the bus clock $CLK_{BUS}$ are input to the BIU 51. An ROM 52 (Read Only Memory) storing an execution code (a program) or the like which is to be executed by the CPU 50 is connected to the code bus, and the BIU 51 accesses the ROM 52 provided on the code bus to read the execution code based on the CPU clock $CLK_{CPU}$. Based on the bus clock $CLK_{BUS}$, moreover, the BIU 51 controls peripheral function sections 53a and 53b provided on the peripheral bus. More specifically, the peripheral function sections 53a and 53b are peripheral devices to be operated based on the bus clock $CLK_{BUS}$. The control of the CPU clock $CLK_{CPU}$ and the bus clock $CLK_{BUS}$ in the BIU 51 will be described below.

In the present embodiment, it is assumed that the CPU 50 and the ROM 52 are high-speed blocks capable of corresponding to a clock having a high frequency (a high-speed clock), while the peripheral function sections 53a and 53b are low-speed blocks which cannot correspond to the high-speed clock.

Figure 2:
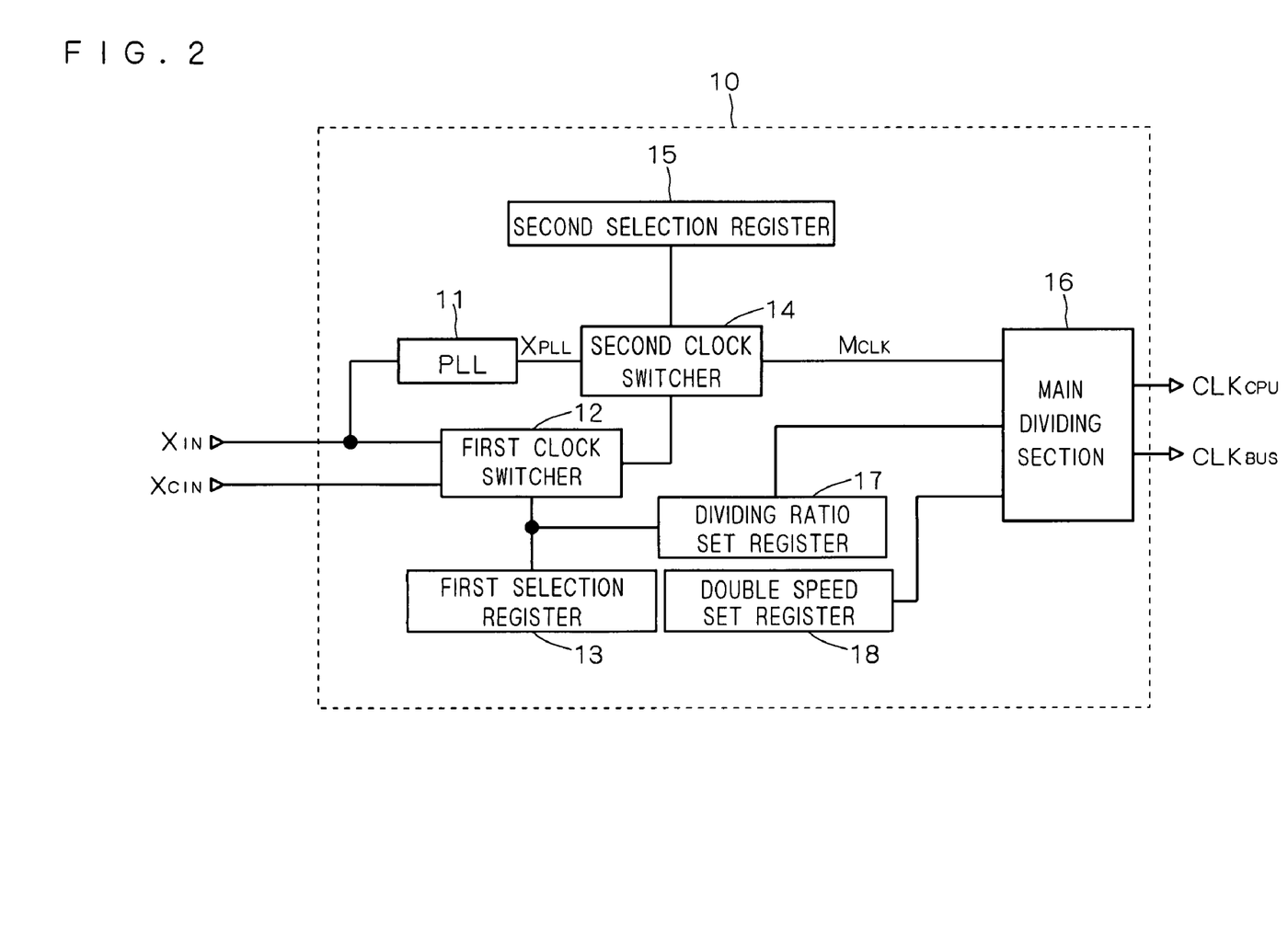
FIG. 2 is a block diagram showing a structure of a clock generating circuit according to the first embodiment.

FIG. 2 is a block diagram showing a structure of the clock generating circuit 10 provided in the MCU. The main clock $X_{IN}$ having a high frequency and the subclock $X_{CIN}$ having a comparatively low frequency are input to the clock generating circuit 10. The main clock $X_{IN}$ is input to a PLL circuit 11 and the PLL circuit 11 outputs a clock $X_{PLL}$ (hereinafter referred to as a "PLL clock") obtained by multiplying the frequency of the main clock $X_{IN}$ by a predetermined coefficient.

Both the main clock $X_{IN}$ and the subclock $X_{CIN}$ are input to a first clock switcher 12, and the first clock switcher 12 selects and outputs either of them. Whether the first clock switcher 12 outputs the main clock $X_{IN}$ or the subclock $X_{CIN}$ is switched depending on a set value stored in a first selection register 13. For example, the main clock $X_{IN}$ is selected in a normal operation and the subclock $X_{CIN}$ is selected in battery driving or the like.

Both the PLL clock $X_{PLL}$ to be the output of the PLL circuit 11 and the output of the first clock switcher 12 are input to a second clock switcher 14, and the second clock switcher 14 selects and outputs either of them. Whether the second clock switcher 14 outputs either of them is switched depending on a set value stored in a second selection register 15. More specifically, an output clock $M_{CLK}$ (hereinafter referred to as a "selected clock") of the second clock switcher 14 is the main clock $X_{IN}$, the subclock $X_{CIN}$ or the PLL clock $X_{PLL}$.

The set values stored in the first selection register 13 and the second selection register 15 may be input and set by an operation of a user or may be automatically set by the control of the CPU 50 depending on an operation state of the MCU.

The selected clock $M_{CLK}$ output from the second clock switcher 14 is input to a main dividing section 16. The main dividing section 16 generates and outputs the CPU clock $CLK_{CPU}$ and the bus clock $CLK_{BUS}$ having equal phases to each other depending on set values stored in a dividing ratio set register 17 and a double speed set register 18.

Figure 3:
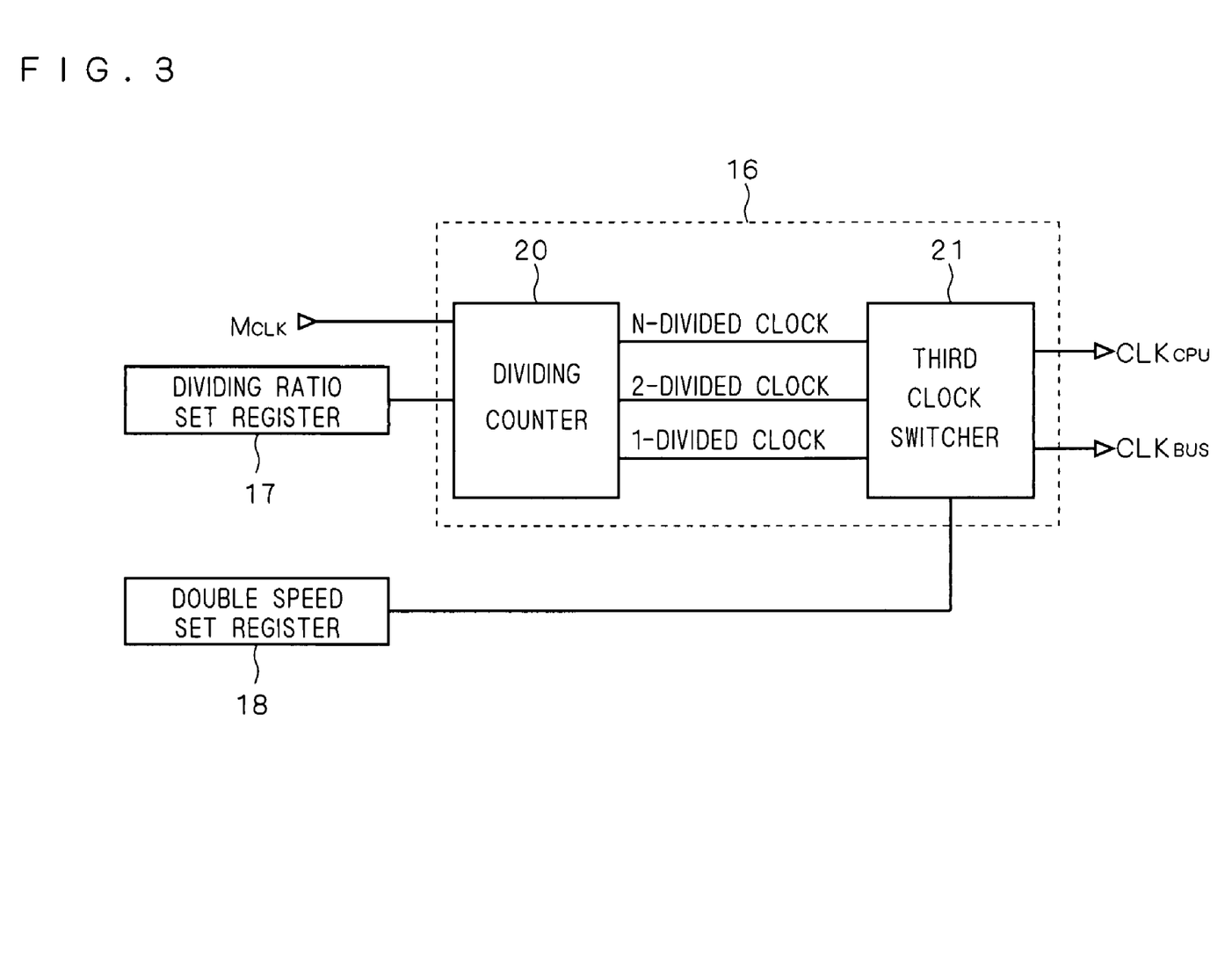
FIG. 3 is a block diagram showing a structure of a main dividing section of the clock generating circuit according to the first embodiment.

The main dividing section 16, the dividing ratio set register 17 and the double speed set register 18 will be described below in detail. FIG. 3 is a block diagram showing a structure of the main dividing section 16. The main dividing section 16 is constituted by a dividing counter 20 and a third clock switcher 21. The dividing counter 20 divides the selected clock $M_{CLK}$ and outputs three kinds of clocks including an N-divided clock obtained by dividing the selected clock $M_{CLK}$ by N (N is an integer), a 2-divided clock obtained by dividing the selected clock $M_{CLK}$ by two and a 1-divided clock obtained by dividing the selected clock $M_{CLK}$ by one (that is, the selected clock $M_{CLK}$ itself). A value of N is stored as a set value in the dividing ratio set register 17. The three clocks are input to the third clock switcher 21, respectively.

The third clock switcher 21 selects and outputs any of the N-divided clock, the 2-divided clock and the 1-divided clock as the CPU clock $CLK_{CPU}$ and the bus clock $CLK_{BUS}$, respectively. Since all of the N-divided clock, the 2-divided clock and the 1-divided clock are obtained by dividing the selected clock $M_{CLK}$ (including one-dividing), the CPU clock $CLK_{CPU}$ and the bus clock $CLK_{BUS}$ have equal phases to each other.

In the third clock switcher 21, any of the N-divided clock, the 2-divided clock and the 1-divided clock is selected as each of the CPU clock $CLK_{CPU}$ and the bus clock $CLK_{BUS}$ by switching depending on the operation mode of the MCU. Setting of the operation mode is stored as a set value in the double speed set register 18. A relationship between the operation mode and the CPU clock $CLK_{CPU}$ and bus clock $CLK_{BUS}$ will be described below in detail. The set value of the operation mode which is to be stored in the double speed set register 18 may be input and set by the operation of the user or may be automatically switched by the CPU depending on the operation state of the MCU.

Figure 4:
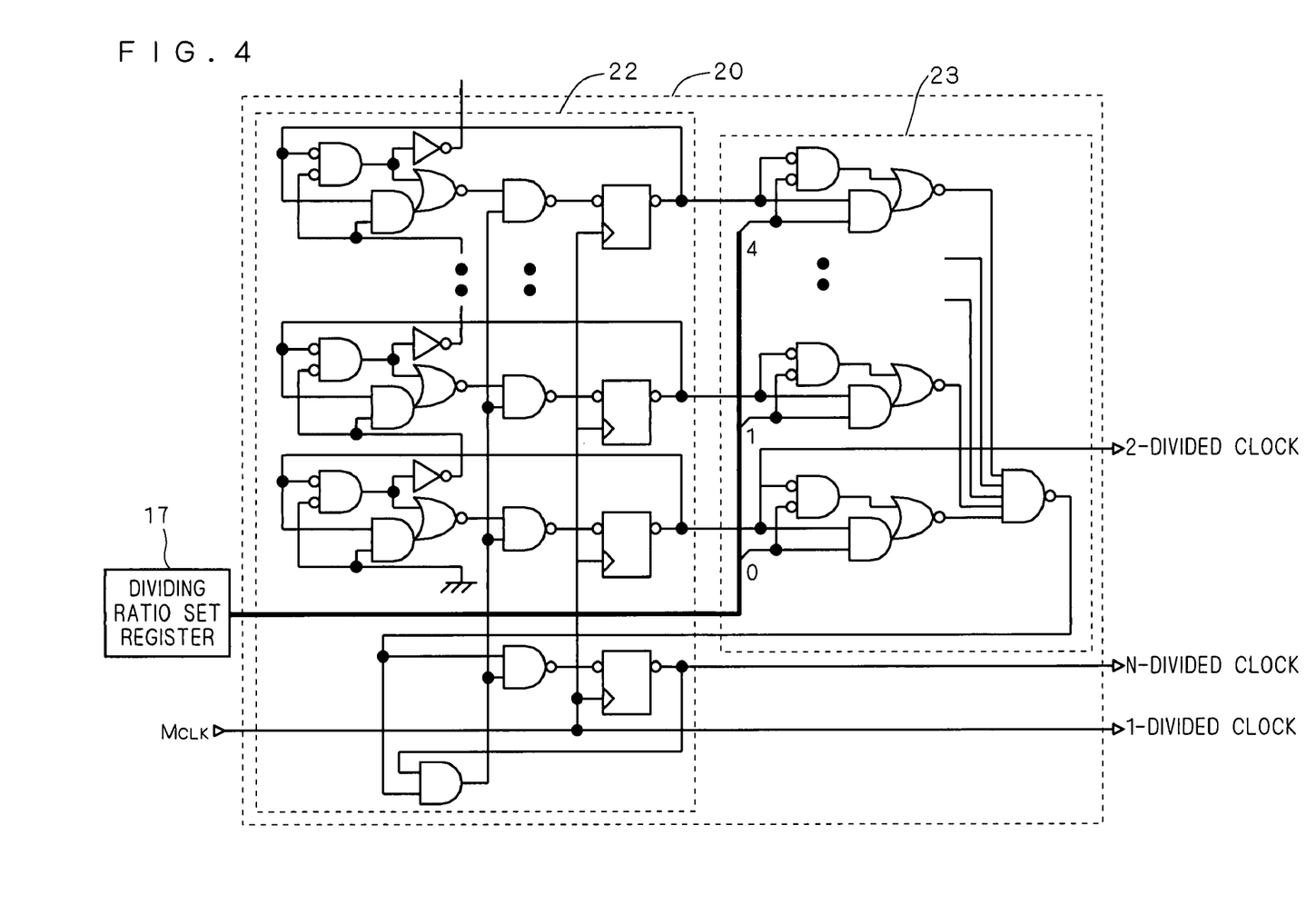
FIG. 4 is a diagram showing an example of a circuit structure of a dividing counter provided in the main dividing section of the clock generating circuit according to the first embodiment.

FIG. 4 is a diagram showing an example of a circuit structure of the dividing counter 20 provided in the main dividing section 16. As shown in FIG. 4, the dividing counter 20 is constituted by a counter circuit 22 (a 5-bit counter) and a coincidence circuit 23. A flip-flop element shown in FIG. 4 is a D flip-flop. The set value N ($N<2^5$) for obtaining the N-divided clock is stored in the dividing ratio set register 17 as described above.

The 5-bit counter 22 counts a pulse of the selected clock $M_{CLK}$ which is input, and the coincidence circuit 23 compares the count value with the set value N of the dividing ratio set register 17. If the count value is coincident with the set value N, one pulse is output to an output terminal of the N-divided clock and the count value of the 5-bit counter 22 is reset. More specifically, the 5-bit counter 22 is operated as an "N-scale counter" based on N set to the dividing ratio set register 17. As a result, a clock obtained by dividing the selected clock $M_{CLK}$ by N is output from an output terminal of the N-divided clock. Moreover, the 2-divided clock is obtained from a least significant bit output of the 5-bit counter 22 as shown in FIG. 4. Furthermore, the selected clock $M_{CLK}$ itself is output as the 1-divided clock from the dividing counter 20.

Figure 5:
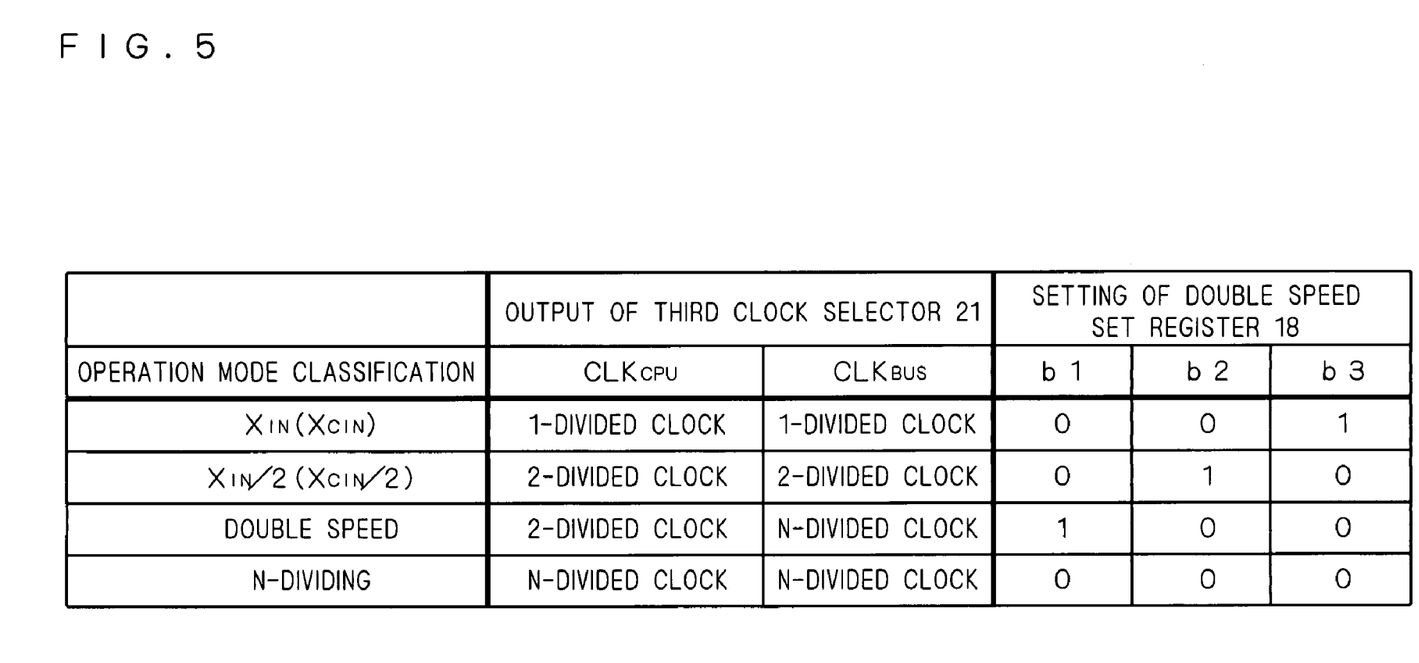
FIG. 5 is a table showing an example of an operation mode of the MCU according to the first embodiment.

Description will be given to the operation modes of the MCU according to the present embodiment and an operation of the third clock switcher 21 corresponding to each of the operation modes. FIG. 5 is a diagram showing an example of the operation mode of the MCU according to the present embodiment. In this example, the operation mode of the MCU is classified into four modes including an "$X_{IN}$ mode", an "$X_{IN}/2$ mode", an "N-dividing mode" and a "double speed mode".

Each operation mode will be described below. First of all, in the $X_{IN}$ mode, the main clock $X_{IN}$ is selected as the selected clock $M_{CLK}$ by the first clock switcher 12 and the second clock switcher 14. The selected clock $M_{CLK}$ is exactly output as the CPU clock $CLK_{CPU}$ and the bus clock $CLK_{BUS}$ from the main dividing section 16. More specifically, both the CPU clock $CLK_{CPU}$ and the bus clock $CLK_{BUS}$ to be the outputs of the third clock switcher 21 are the one-divided clocks input from the dividing counter 20. In this operation mode, in some cases in which the low power consumption function of the MCU is operated, for example, the subclock $X_{CIN}$ is selected as the selected clock $M_{CLK}$ in place of the main clock $X_{IN}$. Since the main dividing section 16 is operated in the same manner, description will be omitted.

In the $X_{IN}/2$ mode, the main clock $X_{IN}$ is selected as the selected clock $M_{CLK}$. Both the CPU clock $CLK_{CPU}$ and the bus clock $CLK_{BUS}$ which are output from the third clock switcher 21 are the two-divided clocks input from the dividing counter 20. More specifically, both the CPU clock $CLK_{CPU}$ and the bus clock $CLK_{BUS}$ are obtained by dividing the main clock $X_{IN}$ by two. In this case, although a processing speed is lower than that in the $X_{IN}$ mode, power consumption can be reduced. Also in this operation mode, the subclock $X_{CIN}$ is selected as the selected clock $M_{CLK}$ in place of the main clock $X_{IN}$ in some cases. The main dividing section 16 is operated in the same manner.

In the N-dividing mode, the PLL clock $X_{PLL}$ is selected as the selected clock $M_{CLK}$. Both the CPU clock $CLK_{CPU}$ and the bus clock $CLK_{BUS}$ which are output from the third clock switcher 21 are N-divided clocks input from the dividing counter 20. For example, if the clock is to simply have a high speed, it is preferable that the value of N should be decreased in the N-dividing mode (for example, N=1). In the case in which the MCU includes a low-speed block which cannot correspond to a high-speed clock, however, the value of N can be decreased to such a degree that the low-speed block can correspond.

In the present embodiment, it is assumed that the CPU 50 and the ROM 52 which are the high-speed blocks can correspond to the 2-divided clock of the PLL clock $X_{PLL}$ and the peripheral function sections 53a and 53b to be the low-speed blocks cannot correspond to a speed which exceeds the 4-divided clock of the PLL clock $X_{PLL}$. In this case, the value of N cannot be set to be smaller than 4 in the N-dividing mode. In other words, the operation speed of the CPU 50 is determined by the peripheral function sections 53a and 53b in the N-dividing mode. In the present embodiment, the set value of the dividing ratio set register 17 is set to be N=4 in the N-dividing mode. In the case in which the low power consumption function is operated, moreover, the value of N is set to be greater.

In the double speed mode, the PLL clock $X_{PLL}$ is selected as the selected clock $M_{CLK}$, and the third clock switcher 21 outputs the 2-divided clock input from the dividing counter 20 as the CPU clock $CLK_{CPU}$ and outputs the N-divided clock as the bus clock $CLK_{BUS}$. Also in this case, it is assumed that N=4 is set. More specifically, in the double speed mode, the CPU clock $CLK_{CPU}$ is obtained by dividing the PLL clock $X_{PLL}$ by two and the bus clock $CLK_{BUS}$ is obtained by dividing the PLL clock $X_{PLL}$ by four. Accordingly, the CPU clock $CLK_{CPU}$ and the bus clock $CLK_{BUS}$ make a combination of clocks having equal phases to each other and different frequencies from each other. In the double speed mode, the CPU 50 and the ROM 52 are operated in response to a clock having a speed which is a double of the speeds of the peripheral function sections 53a and 53b.

In the following description, for simplicity of explanation, operation modes (the $X_{IN}$ mode, the $X_{IN}/2$ mode and the N-dividing mode) in which the CPU clock $CLK_{CPU}$ and the bus clock $CLK_{BUS}$ have equal frequencies will be referred to as "normal modes" in a wide sense.

Figure 6:
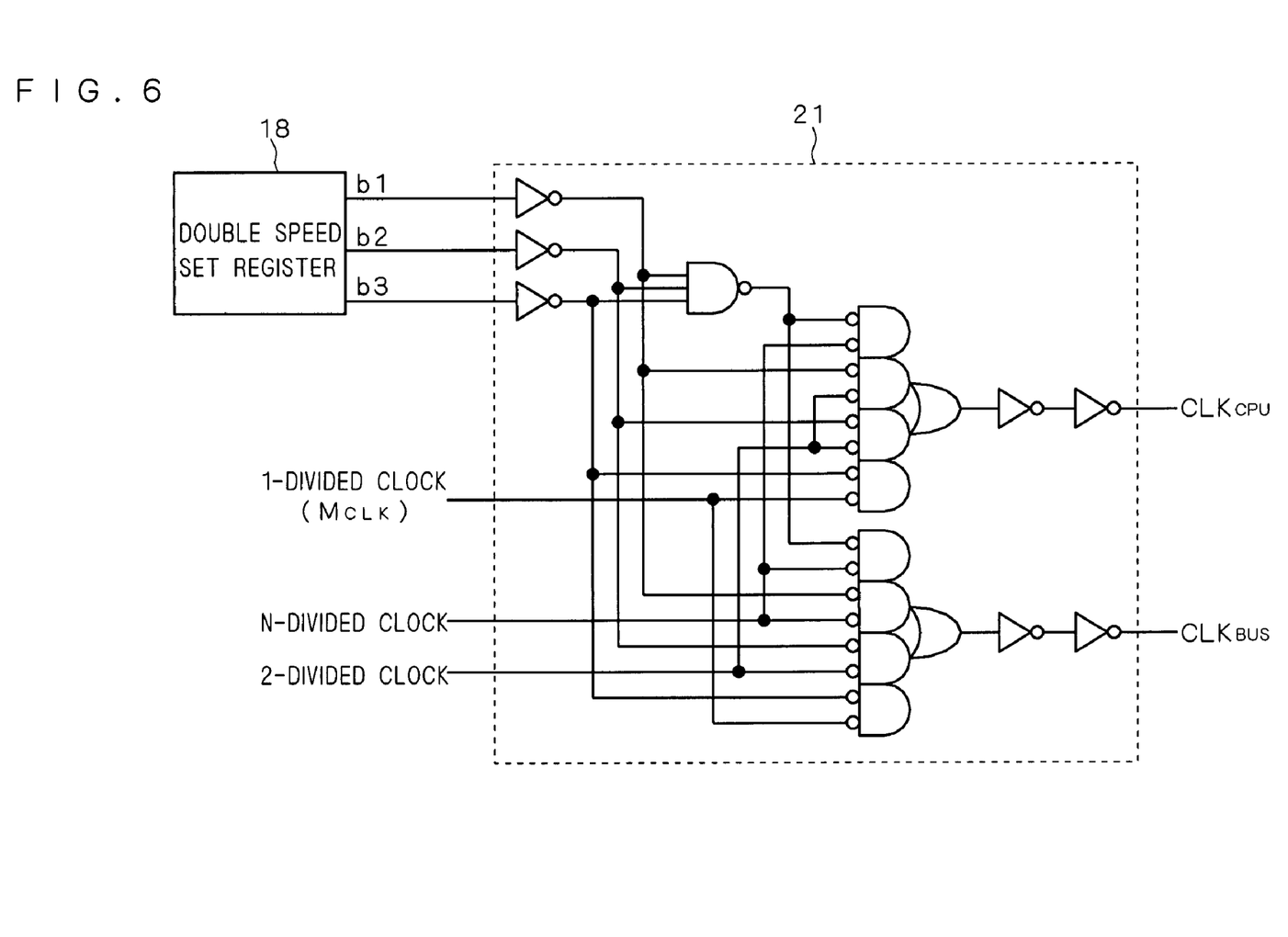
FIG. 6 is a diagram showing an example of a circuit structure of a third clock switcher provided in the main dividing section of the clock generating circuit according to the first embodiment.

FIG. 6 is a circuit diagram showing an example of a structure of the third clock switcher 21. A set value corresponding to each operation mode stored in the double speed set register 18 is input to the third clock switcher 21. The third clock switcher 21 correspondingly switches each of the CPU clock $CLK_{CPU}$ and the bus clock $CLK_{BUS}$ to be output into the 1-divided clock, the 2-divided clock or the N-divided clock. The set value of the double speed set register 18 corresponding to the circuit in FIG. 6 is shown in FIG. 5. More specifically, in this example, 3-bit set value data b1 to b3 are stored in the double speed set register 18, and the third clock switcher 21 is operated in such a manner that the $X_{IN}$ mode is set with b1=0, b2=0 and b3=1, the $X_{IN}/2$ mode is set with b1=0, b2=1 and b3=0, the N-dividing mode is set with b1=0, b2=0 and b3=0, and the double speed mode is set with b1=1, b2=0 and b3=0.

As is apparent from FIG. 5, when the set values held in the double speed set register 18 are b1=1 and b2=0, the double speed mode and the normal mode are set respectively. More specifically, the double speed set register 18 serves to hold the set value b1 for causing the frequencies of the CPU clock $CLK_{CPU}$ (first clock) and the bus clock $CLK_{BUS}$ (second clock) to be equal to each other or different from each other.

Figure 7:
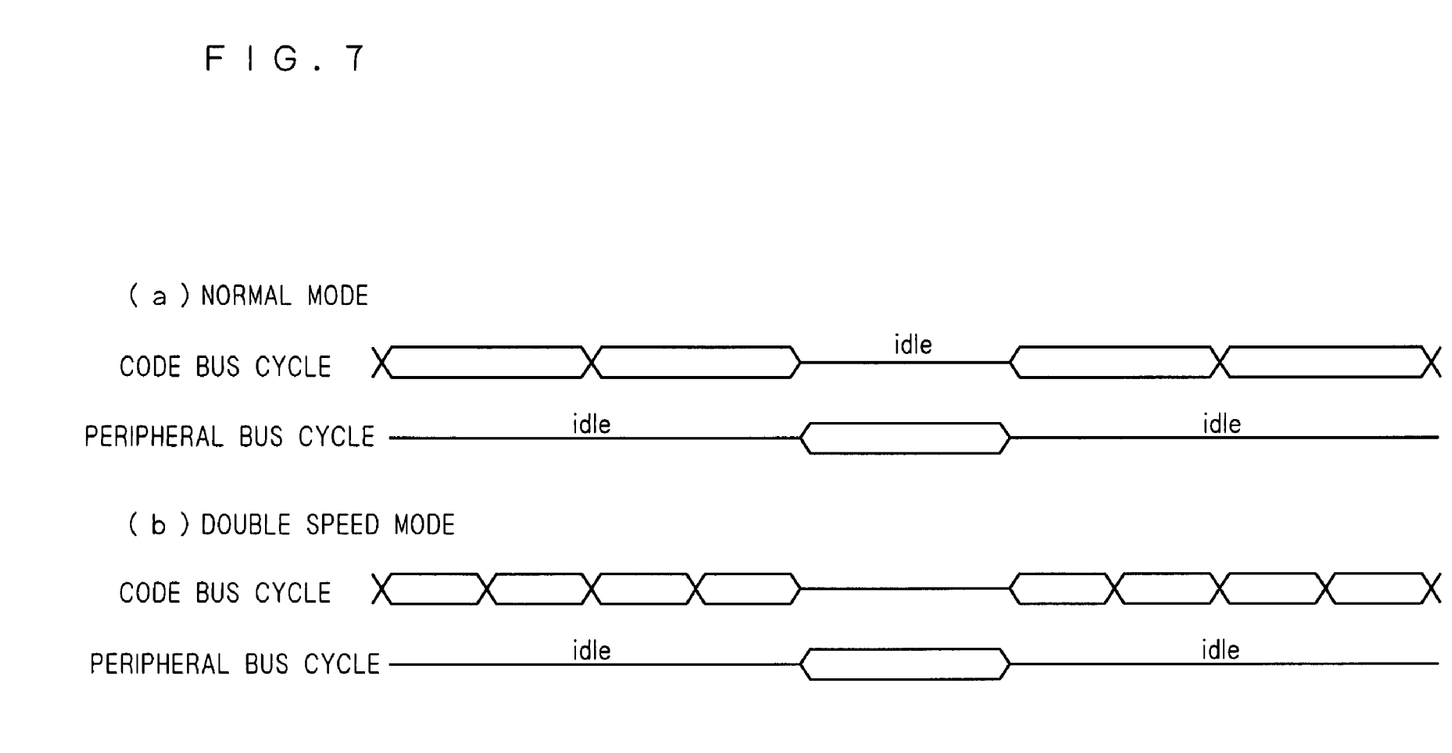
FIG. 7 is a diagram for explaining an operation of a BIU provided in the MCU according to the first embodiment.

FIG. 7 is a diagram for explaining an operation of the BIU 51 shown in FIG. 1. As described above, the BIU 51 controls the code bus based on the CPU clock $CLK_{CPU}$ to access the ROM 52 and controls the peripheral bus based on the bus clock $CLK_{BUS}$ to control the peripheral function sections 53a and 53b. First of all, (a) in FIG. 7 shows a code bus cycle and a peripheral bus cycle in the normal modes (the $X_{IN}$ mode, the $X_{IN}/2$ mode and the N-dividing mode). The BIU 51 alternately switches idle periods of the code bus and the peripheral bus at predetermined timings which are synchronous with the CPU clock $CLK_{CPU}$ and the bus clock $CLK_{BUS}$, thereby controlling operation timings of the code bus and the peripheral bus. In the normal mode, the CPU clock $CLK_{CPU}$ and the bus clock $CLK_{BUS}$ have equal frequencies. Therefore, an operation for switching an idle time can easily be carried out.

(b) in FIG. 7 shows the code bus cycle and the peripheral bus cycle in the double speed mode. Also in this case, the BIU 51 switches the idle periods of the code bus and the peripheral bus at predetermined timings which are synchronous with the CPU clock $CLK_{CPU}$ and the bus clock $CLK_{BUS}$, thereby controlling the respective operation timings. In the double speed mode, although the CPU clock $CLK_{CPU}$ and the bus clock $CLK_{BUS}$ have different frequencies from each other, it is possible to easily control the operation timings of the code bus and the peripheral bus because they have equal phases to each other. Moreover, the BIU 51 carries out such operation timing control. Consequently, it is not necessary to add a circuit for synchronizing the operations of the code bus and the peripheral bus as in the Patent Document 1.

In the BIU 51, the operation timing control based on two different frequencies of the CPU clock $CLK_{CPU}$ and the bus clock $CLK_{BUS}$ is implemented by causing either the code bus or the peripheral bus to be valid (the other is set into an idle (invalid) state). Therefore, the operation timing can easily be controlled. As the double speed mode, there has been described the case in which the frequency of the CPU clock $CLK_{CPU}$ is a double of that of the bus clock $CLK_{BUS}$ (a dual speed mode). When the phases of the CPU clock $CLK_{CPU}$ and the bus clock $CLK_{BUS}$ are equal to each other, the operation timing can easily be controlled by the same method as described above even if the frequencies have a threefold ratio or more, for example. In other words, the application of the present invention is not restricted to the double speed mode.

In the double speed mode according to the present embodiment, the CPU clock $CLK_{CPU}$ is obtained by dividing the PLL clock $X_{PLL}$ by two and has a higher speed than the speed of the bus clock $CLK_{BUS}$ to be the 4-divided clock. Accordingly, a high-speed operation of the CPU 50 can be carried out. On the other hand, the frequency of the bus clock $CLK_{BUS}$ is equal to that in the N-dividing mode. Therefore, a conventional operation can be carried out. More specifically, it is possible to increase the operation speed of the CPU 50 without influencing the operations of the peripheral function sections 53a and 53b in the double speed mode. In other words, the operation speed of the CPU 50 can be prevented from being determined by the operation speeds of the peripheral function sections 53a and 53b. Consequently, the operation speed of the whole MCU can be enhanced. It is possible to increase the operation speed of the CPU 50 without using, as the peripheral function sections 53a and 53b, devices capable of carrying out a high-speed operation. Thus, it is also possible to obtain an advantage that an increase in a cost of the whole MCU can be prevented.

Second Embodiment

According to the first embodiment, the speed of the MCU can be increased. However, there is a problem in that the power consumption of the whole MCU is generally increased with a rise in the clock frequency of the MCU. As a countermeasure, it can be proposed that a clock is to be stopped when the operation of the MCU is not required, for example, in a sleep mode. Consequently, the power consumption can be reduced.

Figure 8:
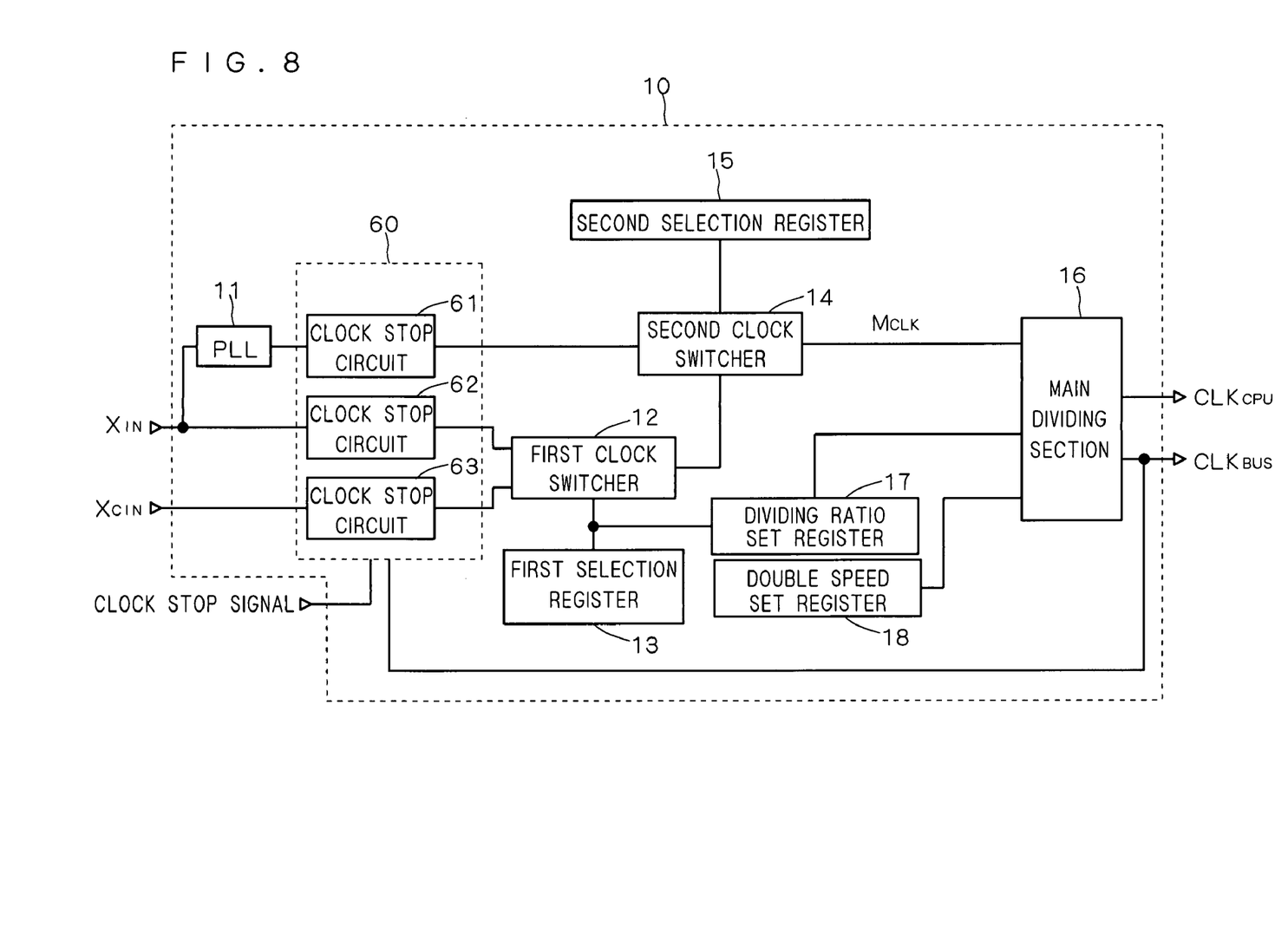
FIG. 8 is a block diagram showing a structure of a clock generating circuit according to a second embodiment.

FIG. 8 is a block diagram showing a structure of a clock generating circuit 10 of an MCU according to a second embodiment. In FIG. 8, elements having the same functions as those in FIG. 2 have the same reference numerals and their detailed description will be omitted. As shown in FIG. 8, the clock generating circuit 10 has a clock stop device 60. In the present embodiment, a CPU 50 outputs a clock stop signal for stopping a clock generating operation of the clock generating circuit 10, which is not shown. The clock stop signal is input to the clock stop device 60 of the clock generating circuit 10. Furthermore, a bus clock $CLK_{BUS}$ output from a main dividing section 16 is also input to the clock stop device 60.

The clock stop device 60 is provided on input sides of a first clock switcher 12 and a second clock switcher 14. Clock inputs to the first clock switcher 12 and the second clock switcher 14 (a main clock $X_{IN}$, a subclock $X_{CIN}$ and a PLL clock $X_{PLL}$) are stopped in accordance with a clock stop signal from the CPU 50, thereby stopping the clock generating operation of the clock generating circuit 10. At this time, the clock stop device 60 is operated to stop each clock at such a timing that one cycle (unit cycle) of the bus clock $CLK_{BUS}$ ends.

Figure 9:
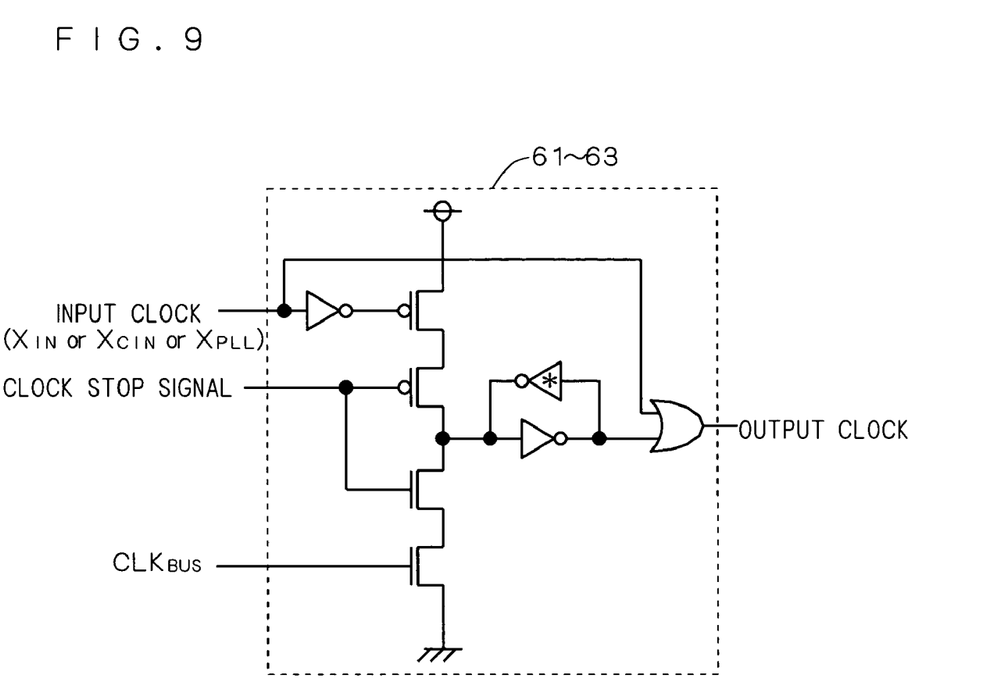
FIG. 9 is a diagram showing an example of a structure of a clock stop circuit of the clock generating circuit according to the second embodiment.

As shown in FIG. 8, the clock stop device 60 is constituted by clock stop circuits 61 to 63 for stopping each of the main clock $X_{IN}$, the subclock $X_{CIN}$ and the PLL clock $X_{PLL}$. FIG. 9 is a diagram showing an example of structures of the clock stop circuits 61 to 63. In the description, it is defined that the unit cycle of the bus clock $CLK_{BUS}$ ends at a rise timing of a pulse of the bus clock $CLK_{BUS}$.

According to the circuit shown in FIG. 9, when the clock stop signal is "1 (High)", an input clock is exactly output as an output clock. On the other hand, when the clock stop signal is changed into "0 (Low)", the output clock is then stopped at the rise timing of the bus clock $CLK_{BUS}$. In other words, a selected clock $M_{CLK}$ is stopped immediately after supply to the main dividing section 16 at such a timing that the unit cycle of the bus clock $CLK_{BUS}$ ends. In a return from a state in which the clock is stopped, accordingly, generation of the clock is started at a head of the unit cycle of the bus clock $CLK_{BUS}$.

As a result, the CPU clock $CLK_{CPU}$ and the bus clock $CLK_{BUS}$ which have constant cycles are generated also in switching of the stop/start of the clock generation. Accordingly, the power consumption of the MCU can be reduced, and furthermore, the operation of the MCU can be prevented from being unstable in the switching of the stop/start of the clock generation.

Third Embodiment

As described above, the PLL clock $X_{PLL}$ is selected as the selected clock $M_{CLK}$ in the "double speed mode". The reason is that it is effective to use any of the main clock $X_{IN}$, the subclock $X_{CIN}$ and the PLL clock $X_{PLL}$ which has the highest speed in order to increase the speed of the MCU.

Figure 10:
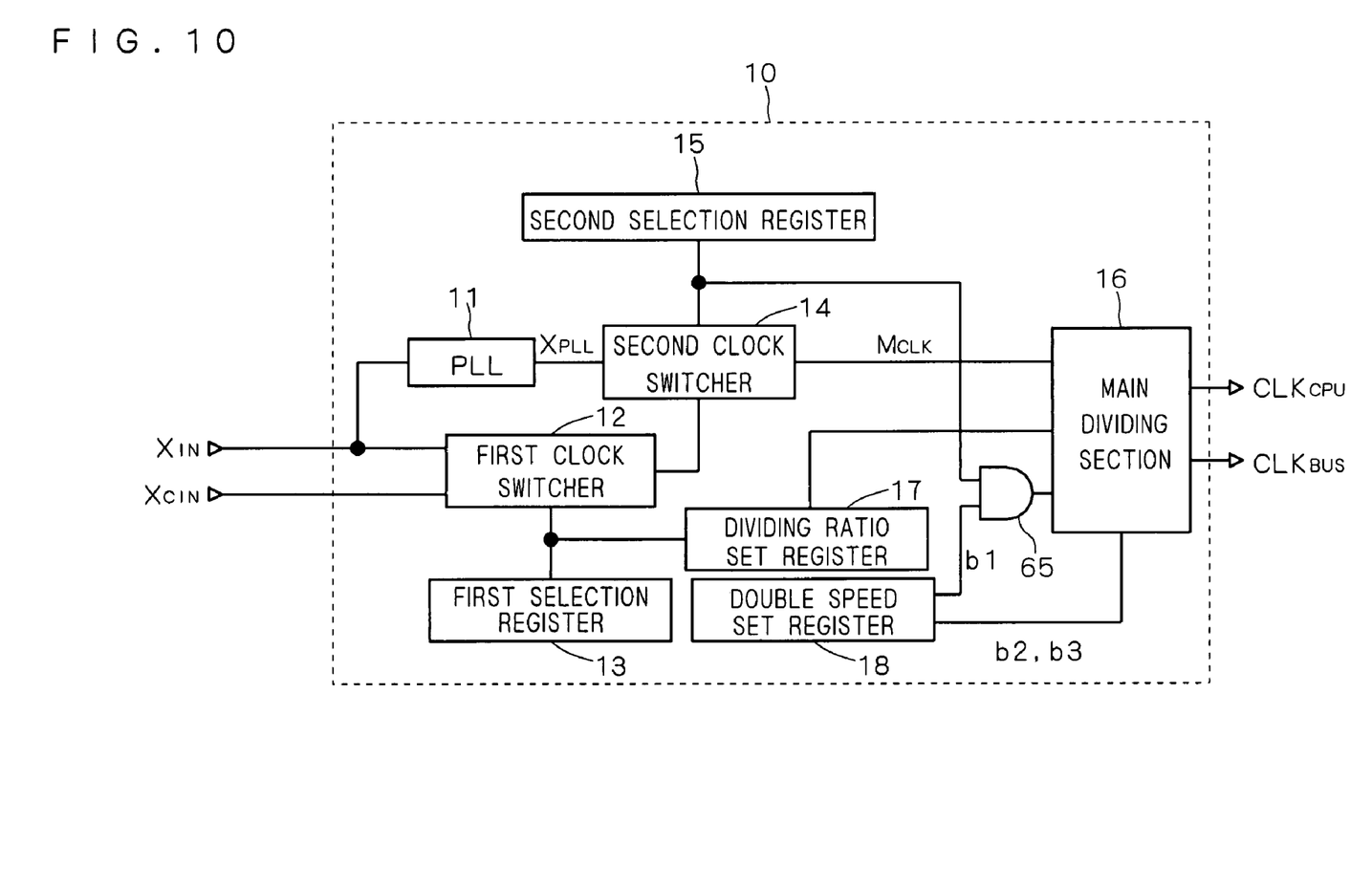
FIG. 10 is a block diagram showing a structure of a clock generating circuit according to a third embodiment.

However, it can be supposed that a main dividing section 16 carries out the operation in the double speed mode due to missetting of a user or a malfunction of a CPU 50 caused by an influence of a noise made on an outside also in the case in which the selected clock $M_{CLK}$ is not the PLL clock $X_{PLL}$. Therefore, the present embodiment proposes a clock generating circuit 10 to be switched into the double speed mode only when the selected clock $M_{CLK}$ is the PLL clock $X_{PLL}$.

FIG. 10 is a block diagram showing a structure of the clock generating circuit 10 according to the present embodiment. Also in FIG. 10, elements having the same functions as those in FIG. 2 have the same reference numerals. In the present embodiment, moreover, it is assumed that a set value of a second selection register 15 is "1" when a second clock switcher 14 is operated to select the PLL clock $X_{PLL}$ and is "0" in other cases. A set value of a double speed set register 18 is the same as that shown in FIG. 5.

The set value of the second selection register 15 and a set value b1 of the double speed set register 18 indicating whether the double speed mode is set are input to an AND circuit 65, and a result of a logical operation is output to the main dividing section 16. An output of the AND circuit 65 is input as the set value b1 to be input to the third clock switcher 21 shown in FIG. 6. Other portions are the same as those in the first embodiment.

Only in the case in which the set value of the second selection register 15 is "1" and the set value b1 of the double speed set register 18 is "1", accordingly, the third clock switcher 21 is switched into the double speed mode. In other words, even if the set value of the double speed set register 18 indicates the setting of the double speed mode, the main dividing section 16 carries out an operation in a normal mode unless the set value of the second selection register 15 is "1". More specifically, the second selection register 15 and the AND circuit 65 function as means for setting a CPU clock $CLK_{CPU}$ and a bus clock $CLK_{BUS}$ to have equal frequencies irrespective of the set value b1 held in the double speed set register 18 (a set value for causing frequencies of the CPU clock $CLK_{CPU}$ and the bus clock $CLK_{BUS}$ to be equal to each other or different from each other).

According to the present embodiment, only in the case in which the second clock switcher 14 selects the PLL clock $X_{PLL}$ as the selected clock $M_{CLK}$, the double speed set register 18 can cause the main dividing section 16 to carry out the operation in the double speed mode. More specifically, in the case in which the selected clock $M_{CLK}$ is not the PLL clock $X_{PLL}$, the main dividing section 16 does not carry out the operation in the double speed mode and it is possible to suppress the influence of the missetting of a user and the malfunction caused by a noise.

Fourth Embodiment

In the case in which an oscillation of a main clock $X_{IN}$ to be a reference clock input from an outside to a clock generating circuit 10 (that is, an external clock) is stopped, a PLL circuit 11 does not input a clock to be a reference of an operation. Consequently, it can be supposed that the operation of the PLL circuit 11 becomes unstable. In that case, an MCU causes a malfunction in a state in which a PLL clock $X_{PLL}$ is selected as a selected clock $M_{CLK}$. Therefore, it is necessary to switch the selected clock $M_{CLK}$ into a signal other than the PLL clock $X_{PLL}$ and to set an operation mode other than a double speed mode. Moreover, if a CPU clock $CLK_{CPU}$ and a bus clock $CLK_{BUS}$ are stopped carelessly, a malfunction is caused so that the operation of the MCU becomes unstable.

Figure 11:
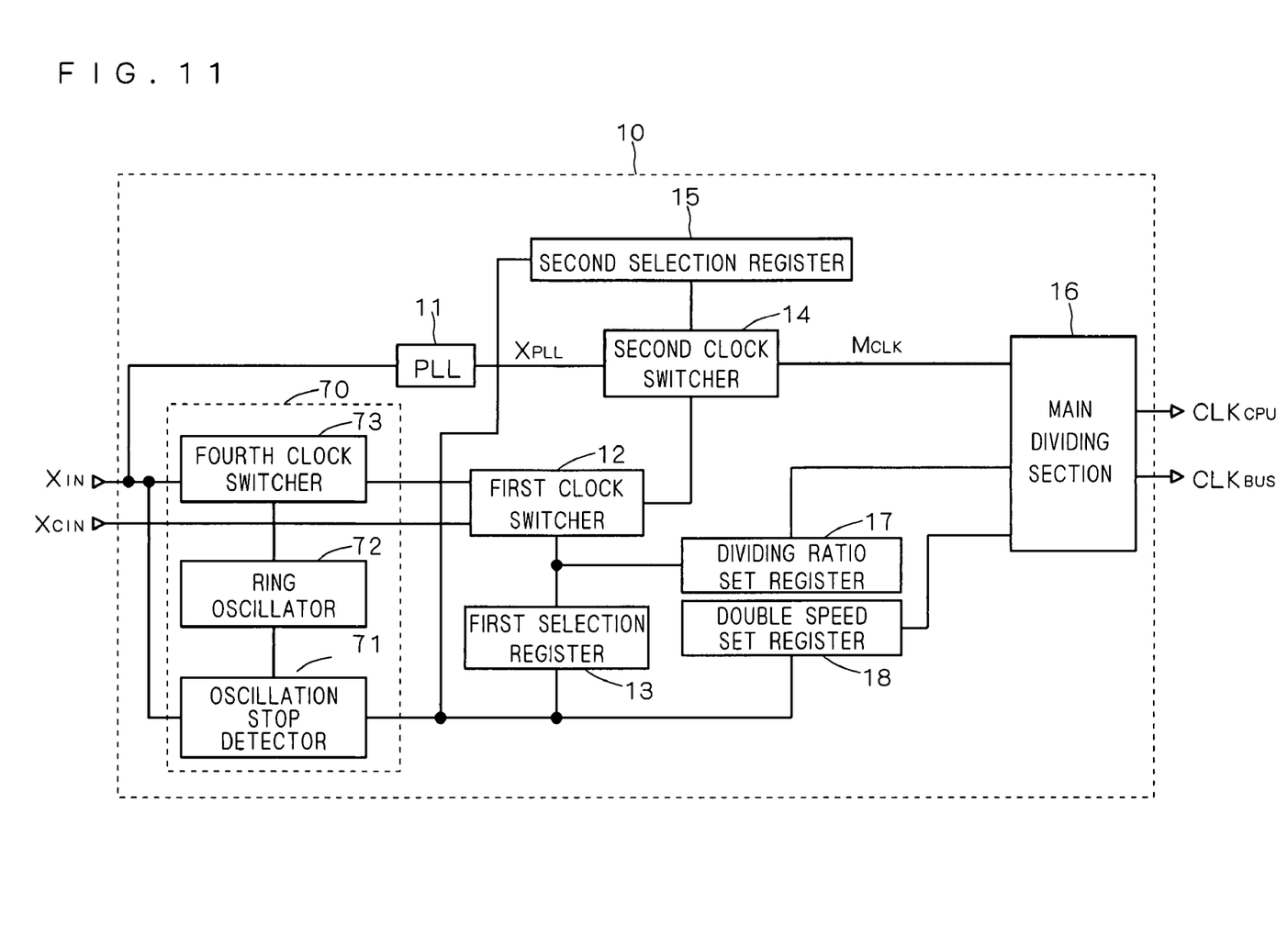
FIG. 11 is a block diagram showing a structure of a clock generating circuit according to a fourth embodiment.

FIG. 11 is a block diagram showing a structure of the clock generating circuit 10 according to the present embodiment. Also in FIG. 11, elements having the same functions as those in FIG. 2 have the same reference numerals. The clock generating circuit 10 has an oscillation monitoring device 70 constituted by an oscillation stop detector 71, a ring oscillator 72 and a fourth clock switcher 73 (a reference clock switching circuit). In a state in which the main clock $X_{IN}$ to be the external clock is input as usual, the ring oscillator 72 is not operated. At this time, the fourth clock switcher 73 outputs the main clock $X_{IN}$ to a first clock switcher 12. The oscillation stop detector 71 monitors the main clock $X_{IN}$ and detects a stop of the main clock $X_{IN}$.

When the stop of the main clock $X_{IN}$ to be the external clock is detected by the oscillation stop detector 71, the oscillation monitoring device 70 carries out the following operation. The ring oscillator 72 starts an oscillation with switching into the main clock $X_{IN}$ and outputs a new reference clock (a third clock) in place of the main clock $X_{IN}$. The fourth clock switcher 73 is switched to output the reference clock sent from the ring oscillator 72 to the first clock switcher 12. Furthermore, the oscillation stop detector 71 controls a first clock selection register 13 and a second selection register 15 to select the reference clock output from the ring oscillator 72 as the selected clock $M_{CLK}$ (that is, to prevent a second clock switcher 14 from selecting the PLL clock $X_{PLL}$). In addition, the oscillation stop detector 71 controls a double speed set register 18, thereby preventing a main dividing section 16 from being operated in the double speed mode.

According to the present embodiment, the clock generating circuit 10 generates the CPU clock $CLK_{CPU}$ and the bus clock $CLK_{BUS}$ based on the reference clock output from the ring oscillator 72 also when the main clock $X_{IN}$ input from the outside is stopped. Accordingly, the malfunction of a CPU 50 and a BIU 51 can be prevented so that a stable operation of the MCU can be carried out.

While the invention has been shown and described in detail, the foregoing description is in all aspects illustrative and not restrictive. It is therefore understood that numerous modifications and variations can be devised without departing from the scope of the invention.

What is claimed is:

1. A micro controller unit comprising:
   a clock generating circuit for generating first and second clocks having equal phases to each other;
   a CPU (central processing unit) to be operated based on said first clock;
   a peripheral device controlled by said CPU and operated based on said second clock;
   a first bus to be operated based on said first clock;
   a second bus to be operated based on said second clock; and
   a BIU (bus interface unit) for controlling operation timings of said first and second buses,
   wherein said clock generating circuit includes a register for holding setting of frequencies of said first and second clocks to be equal to each other or different from each other, and switches said frequencies of said first and second clocks depending on said setting held in said register with said phases of said first and second clocks maintained to be equal to each other said first and second clocks are input to said BIU, said BIU alternately switches idle periods of said first and second buses at predetermined timings which are synchronous with said first and second clocks, thereby carrying out said operation timing control, wherein said clock generating circuit further has a clock stop device which is controlled by said CPU to stop generation of said first and second clocks, and said clock stop device stopping said generation of said first and second clocks synchronously with such a timing that a unit cycle in said second clock ends.

2. A micro controller unit comprising:

a clock generating circuit for generating first and second clocks having equal phases to each other;

a CPU (central processing unit) to be operated based on said first clock;

a peripheral device controlled by said CPU and operated based on said second clock;

a first bus to be operated based on said first clock;

a second bus to be operated based on said second clock; and a BIU (bus interface unit) for controlling operation timings of said first and second buses, wherein said clock generating circuit includes a register for holding setting of frequencies of said first and second clocks to be equal to each other or different from each other, and switches said frequencies of said first and second clocks depending on said setting held in said register with said phases of said first and second clocks maintained to be equal to each other, said first and second clocks are input to said BIU said BIU alternately switches idle periods of said first and second buses at predetermined timings which are synchronous with said first and second clocks, thereby carrying out said operation timing control, and wherein said clock generating circuit further includes means for setting said frequencies of said first and second clocks to be equal to each other irrespective of said setting held in said register.

3. A micro controller unit comprising:

a clock generating circuit for generating first and second clocks having equal phases to each other;

a CPU (central processing unit) to be operated based on said first clock;

a peripheral device controlled by said CPU and operated based on said second clock;

a first bus to be operated based on said first clock;

a second bus to be operated based on said second clock; and a BIU (bus interface unit) for controlling operation timings of said first and second buses, wherein said clock generating circuit includes a register for holding setting of frequencies of said first and second clocks to be equal to each other or different from each other, and switches said frequencies of said first and second clocks depending on said setting held in said register with said phases of said first and second clocks maintained to be equal to each other, said first and second clocks are input to said BIU, said BIU alternately switches idle periods of said first and second buses at predetermined timings which are synchronous with said first and second clocks, thereby carrying out said operation timing control, wherein said clock generating circuit generates said first and second clocks based on a predetermined reference clock, and further includes:

an oscillator for outputting a third clock;

a reference clock switching circuit for switching said reference clock into a predetermined external clock input from an outside of said clock generating circuit or said third clock; and an external clock stop detecting circuit for monitoring said external clock, thereby detecting a stop of said external clock, and said reference clock switching circuit switching said reference clock into said third clock when said stop of said external clock is detected.

4. A micro controller unit comprising:

a clock generating circuit for generating first and second clocks having equal phases to each other;

a CPU (central processing unit) to be operated based on said first clock;

a peripheral device controlled by said CPU and operated based on said second clock;

a first bus to be operated based on said first clock;

a second bus to be operated based on said second clock; and a BIU (bus interface unit) for controlling operation timings of said first and second buses, wherein said clock generating circuit includes a register for holding setting of frequencies of said first and second clocks to be equal to each other or different from each other, and switches said frequencies of said first and second clocks depending on said setting held in said register with said phases of said first and second clocks maintained to be equal to each other, said first and second clocks are input to said BIU, said BIU alternately switches idle periods of said first and second buses at predetermined timings which are synchronous with said first and second clocks, thereby carrying out said operation timing control, wherein said clock generating circuit generates said first and second clocks based on a predetermined reference clock, and further includes:

an oscillator for outputting a third clock;

a reference clock switching circuit for switching said reference clock into a predetermined external clock input from an outside of said clock generating circuit or said third clock; and an external clock stop detecting circuit for monitoring said external clock, thereby detecting a stop of said external clock, said reference clock switching circuit switching said reference clock into said third clock when said stop of said external clock is detected, and wherein said clock generating circuit sets said frequencies of said first and second clocks to be equal to each other irrespective of said setting held in said register when said stop of said external clock is detected.

* * * * *